United States Patent [19]

Fujioka

[11] 4,198,561
[45] Apr. 15, 1980

[54] COMBINATION SET OF A PAN AND A COOKSTOVE

[75] Inventor: Shigeji Fujioka, Kobe, Japan

[73] Assignee: Grill Misono Co., Ltd., Kobe, Japan

[21] Appl. No.: 840,381

[22] Filed: Oct. 7, 1977

[30] Foreign Application Priority Data

Oct. 18, 1976 [JP] Japan ............................ 51-139746[U]
Oct. 28, 1976 [JP] Japan ............................ 51-145457[U]
Nov. 10, 1976 [JP] Japan ............................ 51-151334[U]

[51] Int. Cl.² ......................................... F27D 11/02
[52] U.S. Cl. ..................... 219/433; 219/432; 219/454; 219/444; 219/460; 99/413; 99/444
[58] Field of Search ............... 219/415, 416, 432, 429, 219/433, 455, 459, 456; 99/444, 446, 403, 410–415; 126/383, 50, 390

[56] References Cited

U.S. PATENT DOCUMENTS

| 1,530,416 | 3/1925 | Saeki ................................ 219/415 |
| 1,956,267 | 4/1934 | Blakesley ...................... 219/415 X |
| 2,605,382 | 7/1952 | Kircher et al. ................. 219/433 |
| 3,564,992 | 2/1971 | Sattes ............................... 219/415 |
| 3,679,869 | 7/1972 | Keeler et al. .................... 219/432 |
| 3,719,507 | 3/1973 | Bardeuo ........................... 99/446 |
| 3,866,018 | 2/1975 | Hurko ............................. 219/459 |

FOREIGN PATENT DOCUMENTS 369755  1/1907  France ................................. 99/446

Primary Examiner—Bruce A. Reynolds
Assistant Examiner—M. Paschall

[57] ABSTRACT

A set comprising a pan having a flat bottom and an oblique rim divergently extended from the bottom, and a cookstove having a broad brim, wherein when the pan is placed on the cookstove, a clearance of several millimeters is formed between an outside surface of the oblique rim and an inside end of the broad brim, and a combustion gas flows up through this clearance forming an air curtain thereby protecting the people surrounding this set from the direct smell, and maintaining cooked food temporarily placed on the broad brim at a certain temperature.

19 Claims, 21 Drawing Figures

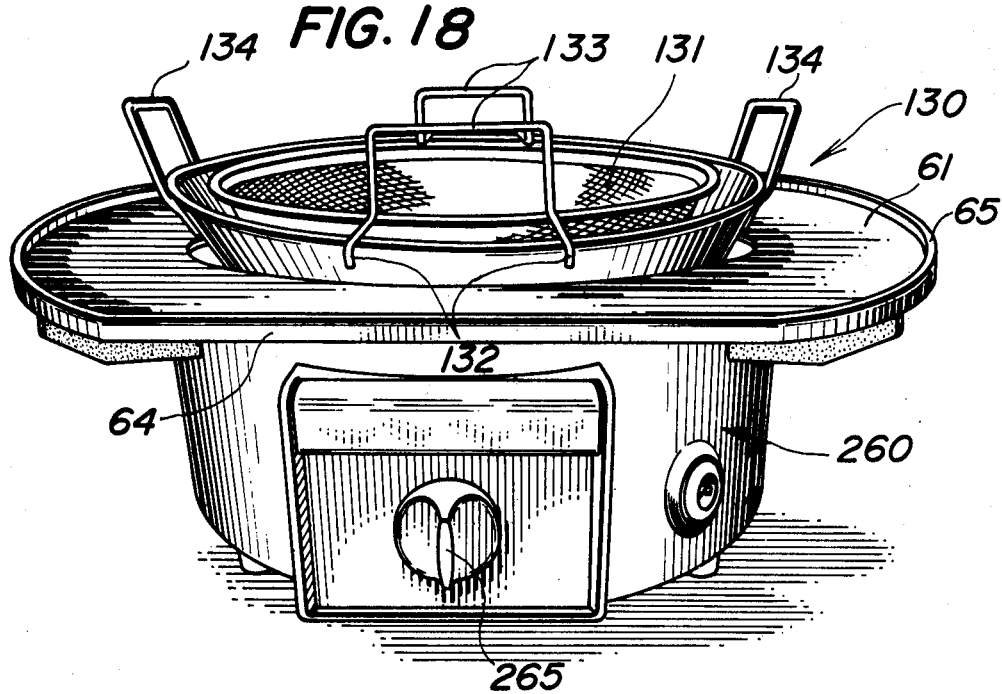
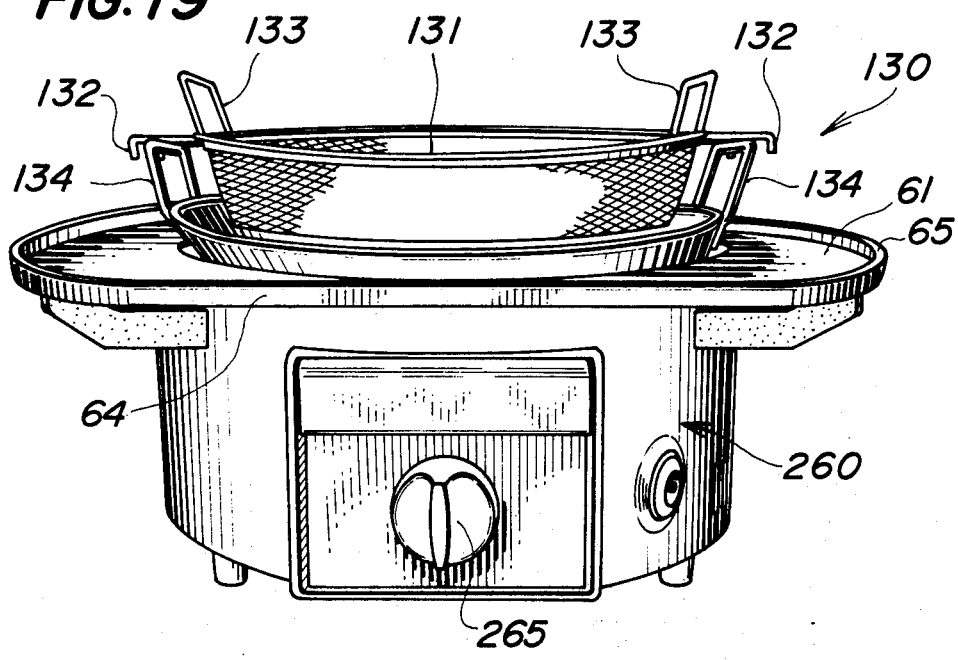

COMBINATION SET OF A PAN AND A COOKSTOVE

The present invention relates to a set of a pan and a cookstove suitable for meals taken by several people together and intended for both home and business use.

Sets of a pan and a cookstove are used in various forms fully achieving their own functions. The present invention is, therefore, to provide an improvement to these known articles. To be specific, the object of the present invention is to provide a set of a pan having an oblique rim having a cutaway portion for facilitating the roasting of meat, and a cookstove.

Another object of the present invention is to provide a multipurpose set of a cookstove and a pan having an oblique rim.

The present invention provides a set comprising a pan for roasting meat having a cutaway portion in its oblique rim, and a cookstove having a horizontal broad brim and an enclosure located in the back of and under the broad brim, wherein they are combined so that a clearance of several millimeters is formed between the outside surface of the oblique rim of the former and the inside end of the broad brim of the latter when the former is placed on the latter.

It is preferable that the pan is made of iron and has a thickness of at least 4 mm. An iron pan has a good durability and does not easily cool down when it is once heated. The pan has a cutaway portion of about 10 cm in its oblique rim, which is so shaped as to facilitate the raking off of fat or fragments of overdone stuff from the pan there through with the pan being placed on the cookstove. By this cutaway portion, the waste stuff can be raked off as necessary without influencing the temperature of the pan nor any loss of heat and tasty roast meat can be cooked. The size of said cutaway portion can be selected according to the size of a spatula used for raking off, but must be larger than the width of the spatula.

The cookstove is provided with a horizontal broad brim preferably made of aluminum having a thickness of about 5 mm. It is preferable that the horizontal brim has a circular plane having the width of about 10 cm, or a circular plane having a linear portion, or an elliptical plane, however, it may have an oblong plane or a square plane, too. The horizontal brim may be secured or detachably mounted on the enclosure. The cookstove may be integrally formed with the heater, or may have a separate heater.

When said pan is correctly placed on an arm of the cookstove, an appropriate interval is formed between the bottom of the pan and the heater, the end of the oblique rim of the pan is a little projected from the horizontal broad brim of the cookstove, and a clearance of several millimeters is formed over the whole circumference between the inside end of the horizontal broad brim and the outside surface of the oblique rim.

The present invention further provides a set comprising a multipurpose pan having a deep oblique rim and a net to be installed in the pan so that it can be engaged therewith and lifted up therefrom, and a cookstove having a horizontal broad brim and an enclosure located in the back of the brim, being combined in use so that a clearance of several millimeters is formed between the outside surface of the oblique rim of the former and the inside end of the broad brim of the latter when the former is placed on the latter. In this case, the enclosure or the arm of the cookstove may be adapted to be variable in order to be adjusted in accordance with the depth of the pan.

The pan engaged with the net is useful for frying tempura, and by lifting up the net the whole pieces of tempura are scooped up from the oil at one time. Cooking of sukiyaki, roasting of meat, or boiling can also be carried out by disengaging the net from the pan.

Other objects and features of the present invention will be apparent from the following embodiments described in reference with the attached drawings.

Figure 8:
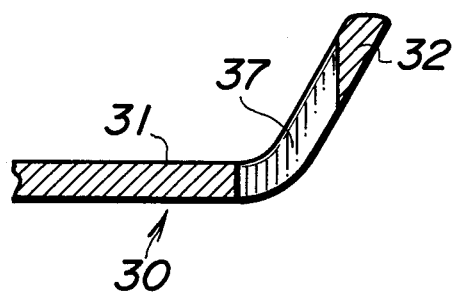
FIG. 8($a$) is a cross-sectional view taken substantially along the lines 8—8 of FIG. 7, shown only partly.
Figure 8:
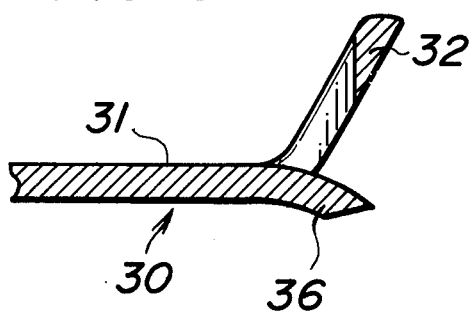
Figure 8:
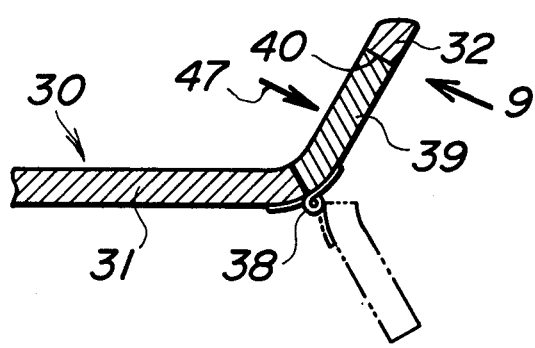
Figure 9:
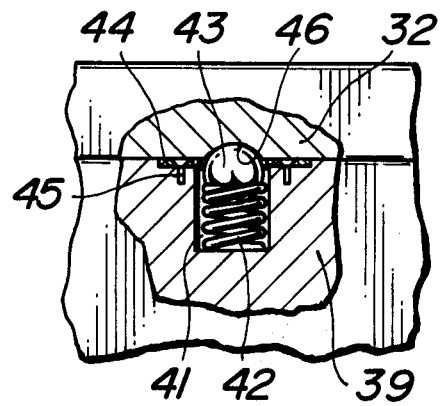
Figure 10:
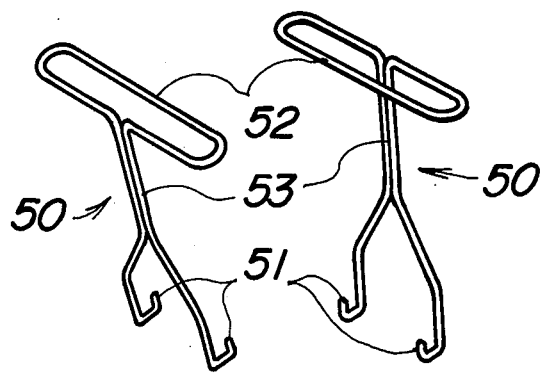
Figure 11:
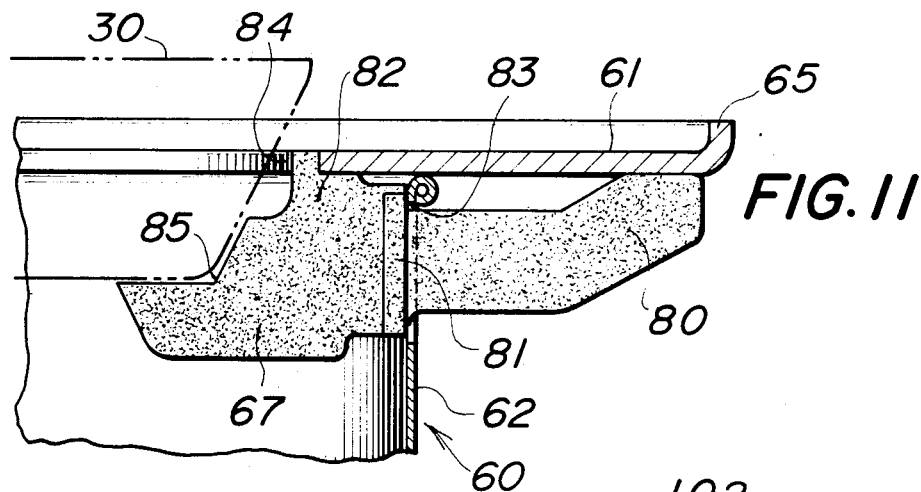
Figure 12:
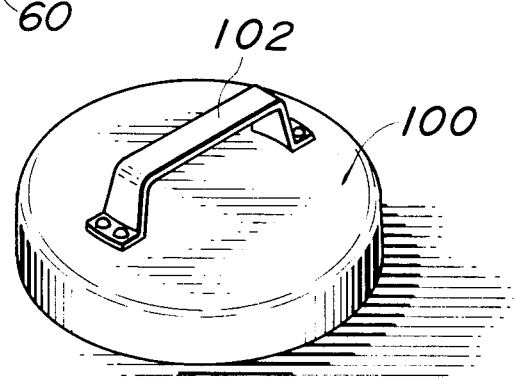
Figure 13:
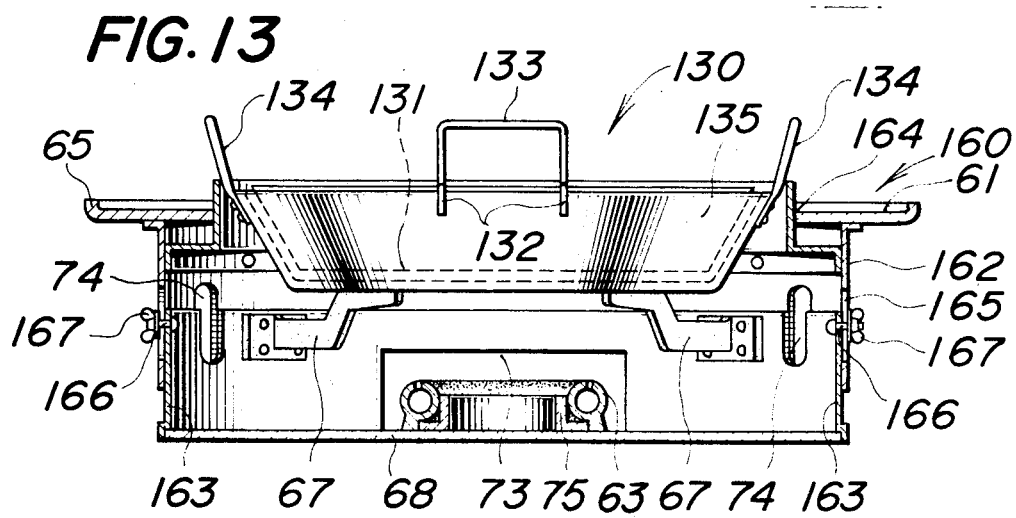
Figure 14:
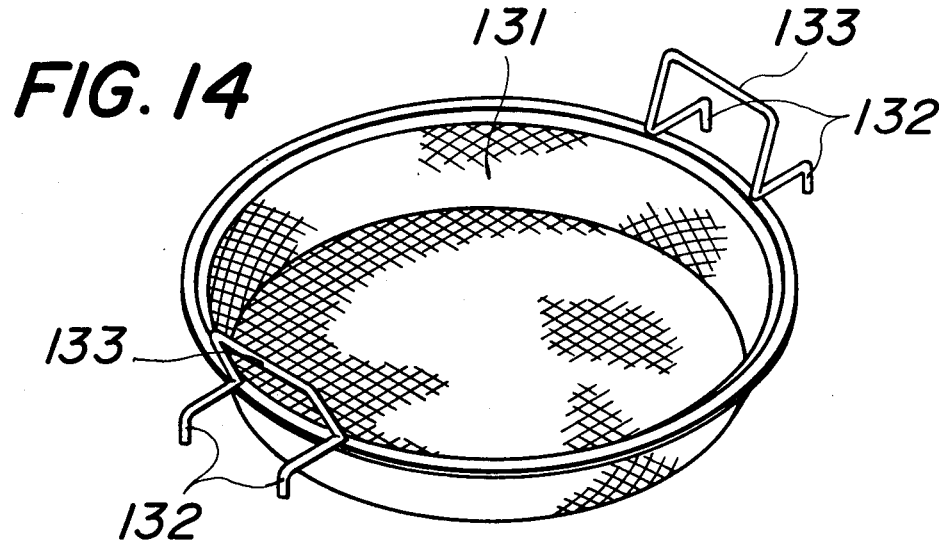
Figure 17:
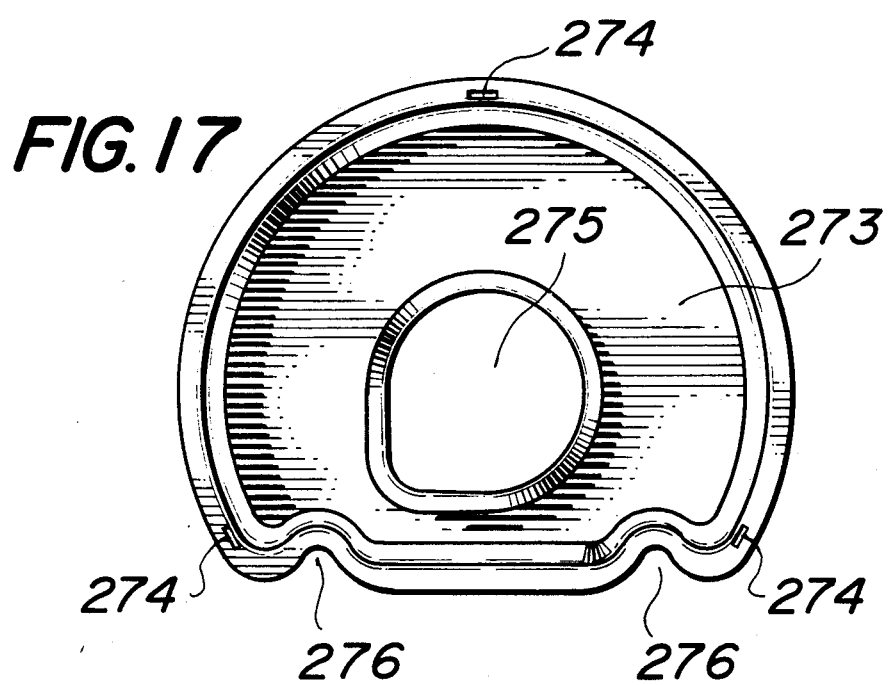
Figure 15:
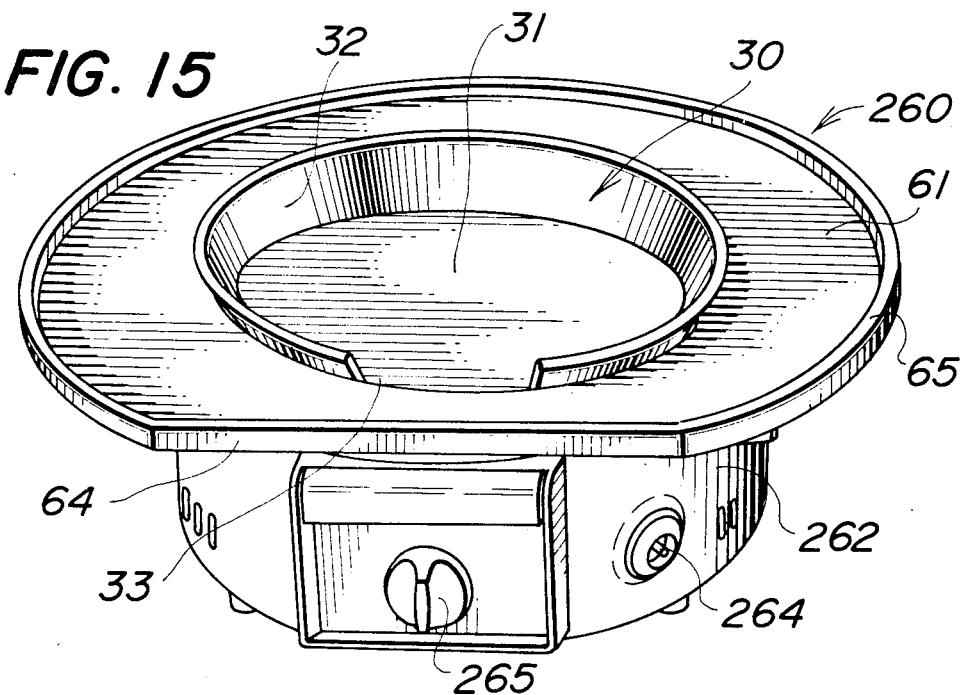
Figure 16:
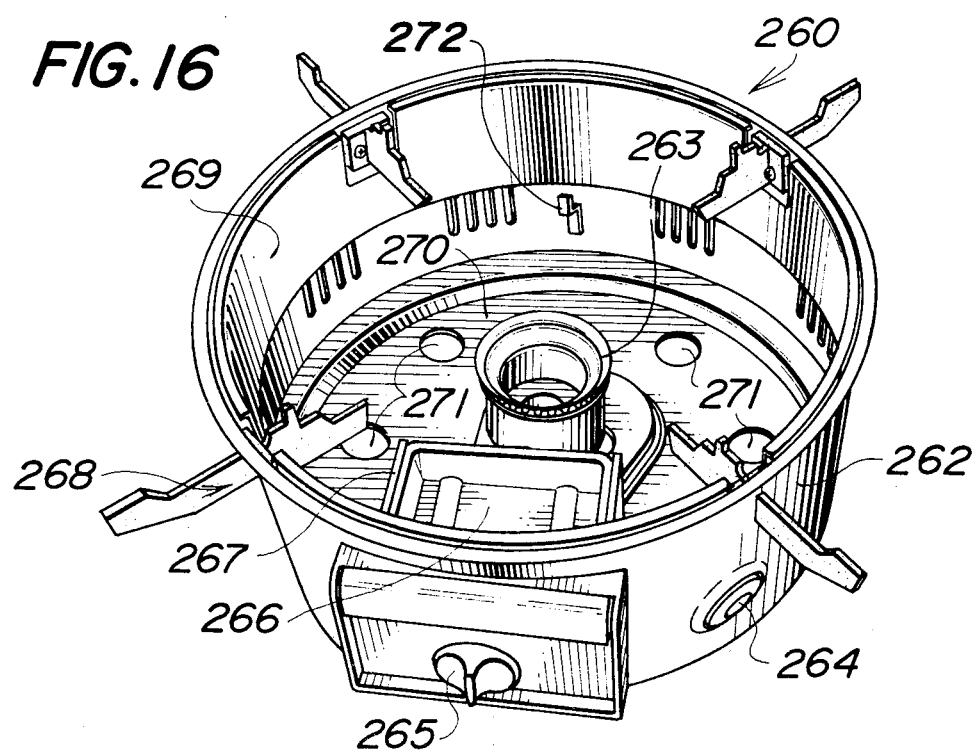

FIG. 8($b$) and FIG. 8($c$) are cross-sectional views similar to FIG. 8($a$), illustrating still another embodiments of the pan;

FIG. 9 is a partly broken away view seen from an arrow 9 of FIG. 8($c$), shown only partly;

FIG. 10 is a perspective view illustrating holders of the pan;

FIG. 11 is an explanatory view illustrating a connecting portion between a broad brim and an enclosure provided on a cookstove;

FIG. 12 is a perspective view illustrating another embodiment of the lid;

FIG. 13 is a cross-sectional view illustrating another embodiment of the set according to the present invention, in which the pan alone is not shown in its cross section;

FIG. 14 is a perspective view of a net engageble with the pan shown in FIG. 13;

FIG. 15 is a perspective view illustrating another embodiment of the cookstove on which the pan is placed;

FIG. 16 is a perspective view illustrating the cookstove of FIG. 15, in this case the broad brim and a reflecting plate being taken off;

FIG. 17 is a plan view of the reflecting plate; and

FIG. 18 and FIG. 19 are perspective views of the cookstove of FIG. 15, illustrating the use thereof with another pan being placed thereon.

Figure 1:
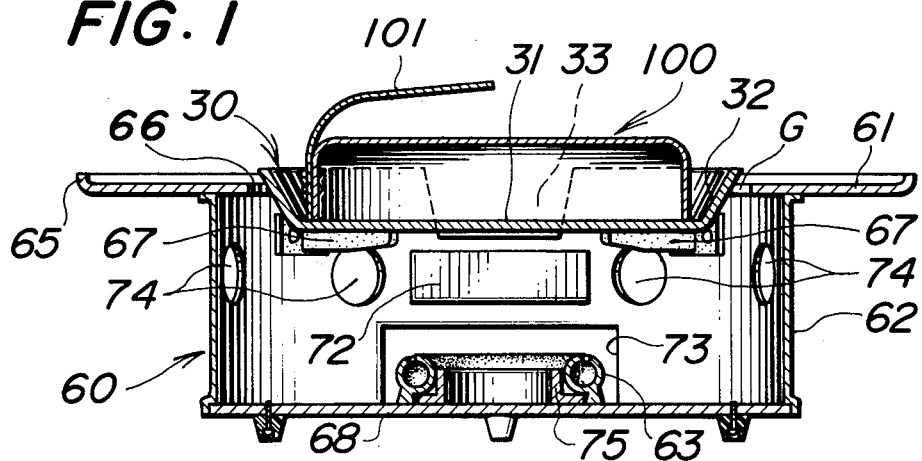
FIG. 1 is a cross-sectional view illustrating one of the embodiments of the present invention.
Figure 2:
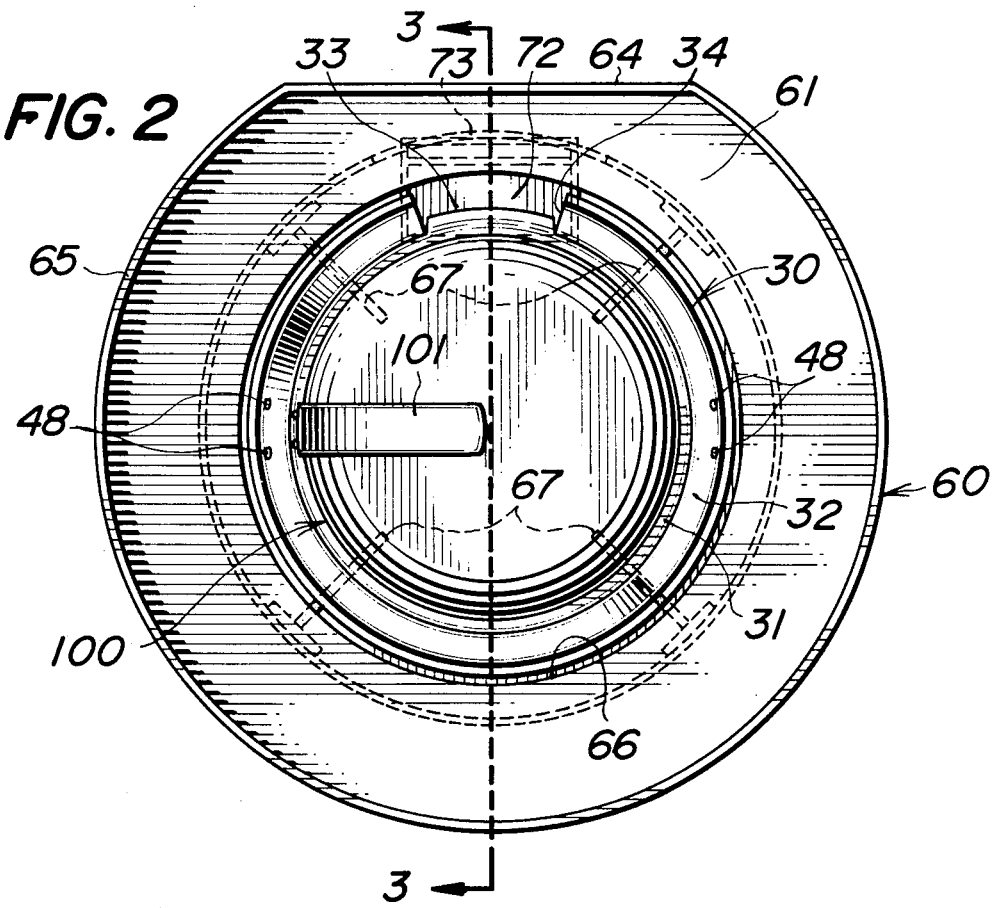
FIG. 2 is a plan view of the embodiment illustrated in FIG. 1.
Figure 3:
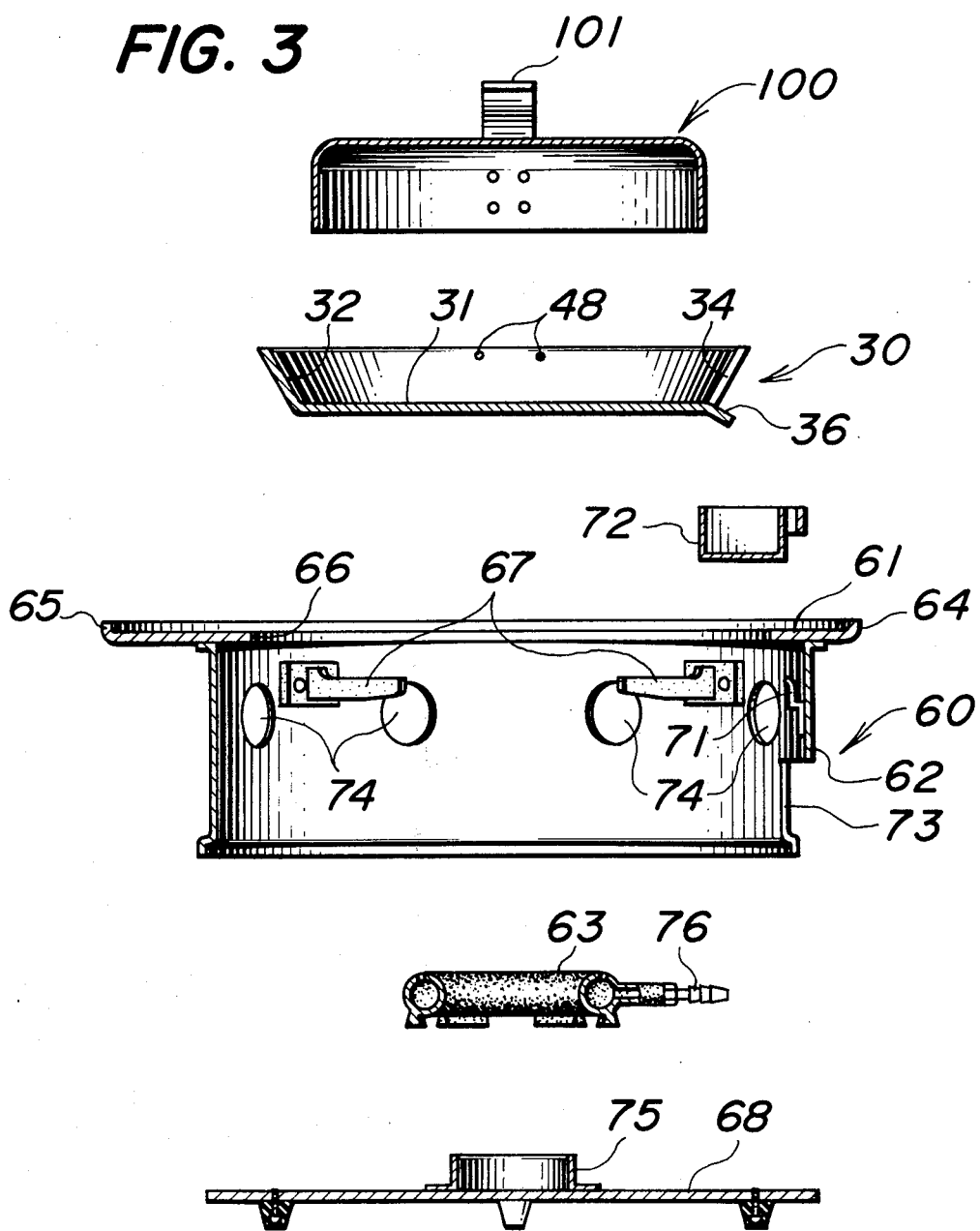
FIG. 3 is a cross-sectional view taken substantially along the lines 3—3 of FIG. 2, each member being separated for clearness.

As shown in FIG. 1–FIG. 3, a combination of a roasting pan 30 and a cookstove 60 constitutes the present invention, and if necessary, a lid 100 may be added to said combination.

Figure 4:
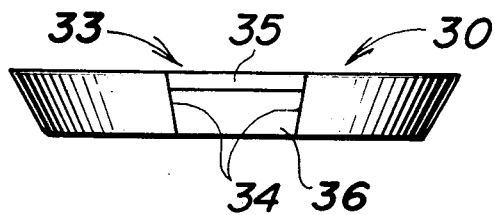
FIG. 4 is an explanatory view illustrating how to form a cut-away portion in a pan.
Figure 5:
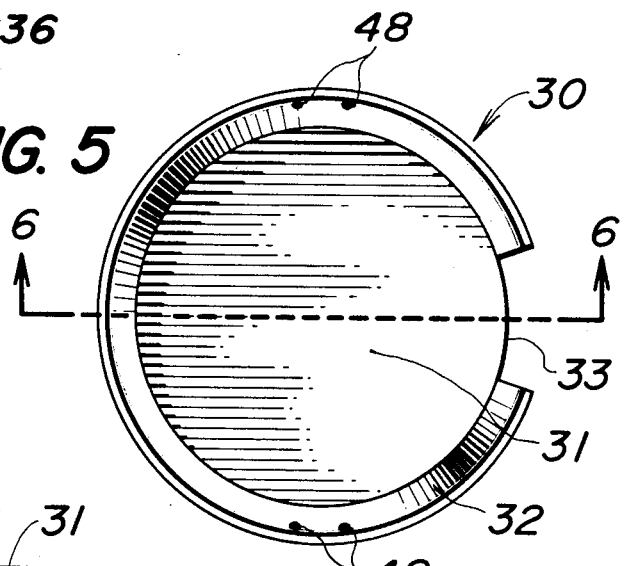
FIG. 5 is a plan view illustrating another embodiment of the pan.
Figure 6:
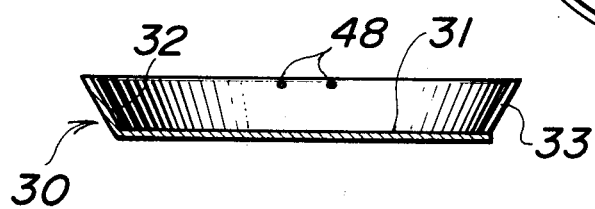
FIG. 6 is a cross-sectional view taken substantially along the lines 6—6 of FIG. 5.
Figure 7:
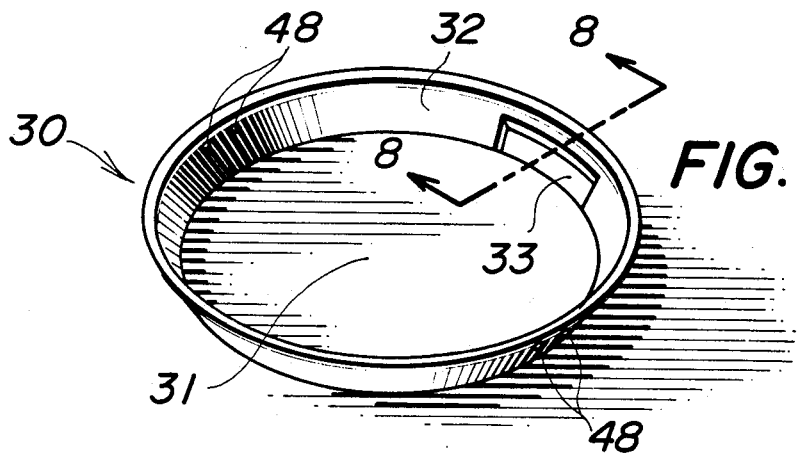
FIG. 7 is a perspective view illustrating still another embodiment of the pan.

The pan 30 may be made of stainless steel, or aluminum etc., but preferably of iron which has larger degree of impregnation with oil in comparison with other material and is said to cause to the pan less scorching and sticking of meat and vegetables including carrot, green pepper, onion, etc. to be roasted with meat owing to the oil impregnated during the use of the pan. From the viewpoint of heat retaining properties, the thicker pan is the better and it must be at least 4 mm. The pan 30 has a flat bottom 31 and an oblique rim 32 divergently projecting from the bottom 31, and the diameter of the bottom 31 of the shown embodiment is approximately 25 cm. As the present invention is particularly intended for the use by several people at meals, a bottom of still larger diameter may be employed. The bottom 31 and the oblique rim 32 are integrally press formed, but may be molded by casting. A cutaway portion 33 is provided in a portion of the oblique rim 32. As shown in FIG. 4, two lines 34, 34 along which to cut off are prepared in a portion of the oblique rim, and an upper portion 35 of a portion enclosed by both lines is cut off, then a remaining portion 36 is folded down to form the cutaway portion 33. In the formation of this cutaway portion, the cutting and the folding are carried out simultaneously by the press forming. The cutaway portion of the present embodiment is about 10 cm long at the upper end of the oblique rim, and about 8 cm long at the bottom portion. These lengths must be larger than the width of the spatula to be used. The cutaway portion 33 may be formed as shown in FIG. 5 and FIG. 6. In this embodiment, the cutaway portion 33 is cut off at an edge portion of the bottom 31 and the folded portion 36 shown in FIG. 3 is not included. The cutaway portion 33 may further be formed as shown in FIGS. 8(a), 8(b), and 8(c). In these embodiments, the cutaway portions are formed as bores, and the upper end portion of each cutaway portion is adjoined to the oblique rim. In FIG. 8(a), the cutaway portion is formed as a punched bore 37, and the downwardly folded portion 36 is provided in FIG. 8(b), and a member 39 pivotally mounted by a hinge 38 is detachably embedded in a bore 40. As shown in FIG. 9, a hole 41 is made in the member 39, a spring 42 and a ball 43 are inserted in this hole 41, a plate 44 and screws 45 are provided for protecting the ball 43 from slipping out, and the member 39 is secured in a closed position as the ball 43 is engaged with a hemispherical recess 46 provided in the oblique rim 32. When the member 39 is pressed in a direction indicated by an arrow 47, the ball 43 is pressed down to the lower part of the hole 41 resisting the spring 42 and the member 39 is brought into an open condition.

In the present embodiment, the oblique rim 32 is about 3 cm long, and the inside diameter of the uppermost end of the oblique rim is about 29 cm. Two bores 48, 48 are opposed to another two bores 48, 48. By inserting folded ends 51, 51 of the holder 50 shown in FIG. 10 into these bores, the pan 30 can be taken out of the cookstove 60 or placed on the cookstove using both hands. Instead of providing the bores in the oblique rim 32 and using the holders 50, handles may be stationarily attached to the oblique rim 32. A rod 53 is welded to a handle 52 and an end portion of the rod 53 is divided into two branches having ends 51, 51 bent at right angles therewith, thereby forming the holder 50.

The cookstove 60 is provided with a horizontal broad brim 61, an enclosure 62, and a heater 63. The broad brim 61 is about 10 cm wide, made of an annular aluminum material and press formed, and as shown in FIG. 2 provided with a linear portion 64 which is narrower than the other portion. A low weir 65 is upwardly provided on the whole outer circumferential edge of this broad brim 61 in order to prevent dropping off of the roasted meat, etc. placed on the broad brim 61. It is preferable that the thickness of the broad brim 61 is at least about 5 mm. The broad brim having this thickness is maintained at the temperature of 70°-80° C. during its use so that the roasted meat temporarily placed thereon can be kept safe from cooling down. A bore 66 provided in the center of the broad brim 61 is circular in the shown embodiment, however, the shape thereof is subject to the cross section of the oblique rim of the pan. Therefore, if the horizontal cross section of the oblique rim of the pan is elliptical, the bore 66 will be elliptical similar to said cross section. In either shapes, the size of the bore 66 or the pan must be so selected as to leave a clearance G having a width of about several millimeters between the outer side of the oblique rim of the pan and the inner end of the broad brim, when the pan is placed on arms 67 attached to the enclosure 62. Further, the arms 67 must be so located as to allow the pan 30 placed thereon to protrude upwardly from the broad brim 61 in an extent less than one fourth of the whole length of the oblique rim, preferably several millimeters. As shown in FIG. 3, the cylindrical enclosure 62 is welded to the broad brim 61, the lower end of the enclosure 62 is slightly widened to be engaged with a bottom plate 68. The broad brim 61 and the enclosure 62 may be engagedly attached as shown in FIG. 11. The arm 67 for the pan and a supporting arm 80 for the broad brim are integrally formed through a flange 81, a projection 82 is provided upwardly from the arm 67, and these members thus formed are fixed to the enclosure 62 so that the supporting arm 80 is projected from a slit 83 to the outer side of the enclosure. On the other hand, a cutaway portion 84 is provided in the inside of the broad brim 61, and the projection 82 is engaged with this cutaway portion 84, whereby the broad brim 61 is supported by the supporting arm 80. The arm 67 is provided with a tiered portion 85 for preventing the sideward movement of the pan 30 and maintaining a regular width of the clearance G. A hanger 71 is fixed in the inside of the enclosure 62, and a waste receiver 72 is suspended at one side thereof for receiving fragments of overdone meat, etc. dropped from the cutaway portion 33 of the pan. The enclosure 62 is provided with a cutaway portion 73 for inserting a hose, etc. to be connected to the heater 63, and airports 74 are formed as necessary. Said arms 67 must be fixed to the inside of the enclosure 62 so as to satisfy said requirements, and the least number of arms satisfactory to stabilize the placement of the pan will be preferred, as four in the shown embodiment. The enclosure 62 of the shown embodiment is made of aluminum, but it may be made of other materials, too.

The heater 63 is a gas burner as known per se, and fitted with a cylinder 75 projecting in the middle of the bottom plate 68 for stabilizing itself. The heater 63 has a nipple 76 to which the hose is connected, and gas is supplied from a gas source (not shown) to carry out the heating. Insted of the gas heater 63, a known electric heater may be used. The height of the enclosure 62 of said cookstove is preferably changed according to the kind, or the calorific value of the heater 63, and the enclosure 62 of the present embodiment is 10 cm high. In regard to the assembly of said set of the present invention, the heater is at first placed on the bottom plate 68, then the enclosure 62 is engaged with the bottom plate, then the waste receiver 72 is suspended from the hanger 71, and then the pan is placed on the arms.

A lid 100 is for steaming the meat during the roasting thereof, made of stainless steel having an outside diameter slightly smaller than the diameter of the bottom portion 31 of the pan and a height of about 5 cm, and provided with a rivetted handle 101 for facilitating the handling thereof. This handle 101 is slanted upwardly, as shown in FIG. 1. This lid is made of aluminum as shown in FIG. 12, and may have a handle 102 secured to the lid at both ends.

Shown in FIG. 13 is another embodiment of the present invention. Similarly to previous embodiment, it comprises a combination of a pan 130 and a cookstove 160, however, the pan 130 is not provided with a cutaway portion but a stainless steel net 131 engaged therewith so that it may be lifted up and taken off. This net has a wide-spaced network with an interval of about 4 mm, and has a shape similar to that of the pan. As shown in FIG. 14, respectively two L-shaped rods 132 are projected from the upper end of the net horizontally and outwardly, each pair opposing to the other. These rods 132 are placed on the upper end of the pan during the use thereof. This net is intended for tempura. After frying of the ingredients of tempura is finished, the handle 133 is mannually held and lifted up thereby lifting the whole net with the fried stuff. Then said rod 132 is placed on a handle 134 attached to the pan. Thus the oil contained in the fried stuff is separated. For effecting this separation of the oil, the height of the handle 134 from the upper end of the pan must be larger than the depth of the net 131. In the shown embodiment, the pan 130 is 6 cm deep, and the diameter of its bottom is 25 cm, and made of iron, while the net 131 is 5 cm deep.

The cookstove 160 is different from the previous embodiment in such respects that the enclosure is dividedly formed into an upper enclosure 162 and a lower enclosure 163, and that a slide enclosure 164 vertically movable for adjusting the interval between the inside end of the broad brim 61 and the pan is projected from the upper enclosure 162. The upper enclosure 162 is welded to the broad brim for supporting thereof, provided with six enlongated bores 165, and adapted to be vertically movable and fastenable with respect to the lower enclosure 163 by means of a bolt 166 and a butterfly nut 167. When the upper enclosure and the lower enclosure are overlapped to the maximum extent, the enclosure becomes about a little less than 10 cm, and when extended to the utmost extent it becomes about 15 cm high. With the adjustment of the height, the protruding length of the pan upwardly from the broad brim is substantially invariable even the depth of the pan is changed. The slide enclosure 164 is also adapted to be vertically movable and fastenable with respect to the upper enclosure 162 by a similar mechanism. Other members identical with previous ones are designated by identical numbers. When using the set of the present invention, the lower enclosure is lowered so that the upper end of the rim of the pan is a bit projected from the horizontal broad brim of the cookstove, and then it is tightly secured to the upper enclosure. Then, if necessary, the slide enclosure is lifted as high as the end of the rim of the pan or a little higher than that and then stopped by the upper enclosure, whereby the interval between the inner surface of the slide enclosure and the outer surface of the oblique rim is adjusted as necessary for obtaining aforementioned width.

Shown in FIG. 15 is the pan 30 combined with still another cookstove 260. This cookstove 260 is provided with a broad brim 61 engaged with the enclosure 262 to which the gas burner is secured. In the previous embodiments, the heater is separate from the cookstove and a heater on hand therefore can be applied to the pan of the present invention or others too, however in the present embodiment, the gas burner is exclusively used for this cookstove 260. As shown in FIG. 16, a gas burner 263 is known per se and gas is led from a connecting member 264 for the gas hose which is also known per se, and the flow rate is adjusted by an adjusting screw 265, and then the gas is sent to the gas burner 263. A waste receiver 266 is adapted to be drawn out slidingly and horizontally along a trough 267 secured to the enclosure 262. An arm 268 is formed identically with the one shown in FIG. 11. Numeral 269 designates an adiabatic member fixed to the inside of the enclosure 262 through an air layer. The enclosure 262 is formed by the deep drawing and has a integrally formed bottom plate 270 which is provided with several airports 271 for supplying air to the cookstove. Rubber feet are screwed (not shown) to the outside of the bottom plate for creating an interval between the bottom plate and a table etc. on which the cookstove is placed.

Numeral 272 designates an L-shaped stop member which is inserted into a bore 274 provided in a reflecting plate 273 for stopping the reflecting plate 273 shown in FIG. 17. The reflecting plate 273 is for reflecting heat as well as receiving stuffs fallen through said clearance G. In the middle of the reflecting plate provided is a bore 275 for passing the burner 263, and recesses 276 are provided in a linear portion for protecting the arms 268 from being hit by the reflecting plate when inserting the latter.

Shown in FIG. 18 and FIG. 19 is the pan 130 placed on the cookstove 260, wherein FIG. 18 shows the net 131 engaged with the pan and FIG. 19 shows the net 131 lifted from the pan and held in a lifted condition.

As the set according to the present invention is thus constituted, when the cookstove is placed enclosing the heater and the pan 30 is correctly placed on the arms so that the cutaway portion of the oblique rim comes over the tube connector of the heater, an appropriate interval is formed between the bottom of the pan and the heater, the end of the oblique rim of the pan is slightly projected from the horizontal end of the broad brim, and a clearance of several millimeters are formed over the whole circumference between the inside end of the horizontal broad brim and the outside surface of the oblique rim.

With this pan, meat to be roasted, etc. are heated. During the roasting of meat, the lid is used as necessary. This lid controls the evaporation and dispersion of water contained in meat, etc. for a better effect of steam-roasting. Then the roasted meat as it is or cut into pieces is temporarily placed on the horizontal broad brim of the cookstove, and served. This procedure is repeated as necessary. The heat for heating in this case is not conducted directly from the pan to the cookstove, but the periphery of the upper end portion of the enclosure of the cookstove and the horizontal broad brim are heated by the radiant heat from the heater, and the air containing combustion gas in the enclosure flows substantially upwardly through the clearance between the inside end of the broad brim and the outside surface of the oblique rim of the pan. This upward air flow shuts the radiated heat and the peculiar smell of meat being roasted out from the people surrounding the cookstove. At this time, the temperature of the surface of the horizontal broad brim is kept at about 80° C. Therefore, the roasted meat, etc. placed on the broad brim are not cooled down and they can be enjoyed at their tastiest temperature condition without letting down their taste. The horizontal broad brim is most related with the taste of the roasted meat and the temperature, and if it is made of an aluminum material of a high purity, the heat conductivity and diffusion are extremely superior with no partial accumulation, and substantially whole surface of the horizontal broad brim is easily maintained at a desirable temperature. In addition, if this material is used, the cookstove occupying the largest portion of the set of the present invention can be reduced in weight, being comparatively lighter for its large shape, thereby facilitating the handling of the set. The same can be said as to the use of the pan 30 combined with the cookstove 260.

The pan 130 is used for cooking sukiyaki, roasting meat, and frying tempura, etc. When cooking tempura, the net 131 is engaged within the pan 130, and after frying is over, the handles 133 of the net are manually lifted up and supported by placing the rods 132 on the handles 134 of the pan for separating oil from the fried tempura. That is, many pieces of tempura in the pan are securely kept in the net, and lifted up as they are, and after separating the oil, they may be placed on the broad brim in front of the people surrounding the cookstove and can be served almost simultaneously without wasting time and spoiling the fun. When cooking sukiyaki, or roasting meat, etc., the net 131 ought to be taken off from the pan 131. In the combination of the pan and the cookstove, a considerably strong updraft exists between the outside surface of the oblique rim of the pan and the inside surface of the slide enclosure, the peculiar smells of the stuff being boiled or the meat being roasted in the pan or the useless heat from the pan are shut off by this updraft from the people around and so it scarcely happens that they are directed to the surrounding people displeasing them. In addition, while frying tempura, sudden splashes of the oil of a high temperature can be obstructed by this updraft in a good degree. The same can be said as to the pan 130 used in combination with the cookstove 260.

What is claimed is:

1. In a set including a combination of a pan having a flat bottom and an oblique rim divergently extended from the bottom, and a cookstove used in combination with a heater to be housed therewithin and having an enclosure and a horizontal brim supported by the enclosure, the enclosure being provided with arms for putting the pan thereon and air ports, the arms being provided in such a manner that a portion of the oblique rim of the pan projecting above the brim is shorter than a portion of the oblique rim of the pan located under the broad brim, when the pan is placed on the arms wherein the improvement comprises the oblique rim of the pan having a cutaway portion with a protrusion extending downwardly from the bottom of the cutaway portion, the brim of the cookstove being broad enough to put roasted foods thereon, said brim extending radially inwardly and outwardly from the top of the enclosure for keeping an appropriate warm temperature when the set is in use and being provided with a low weir on the whole outer circumferential edge thereof to protect the foods and others from dropping therefrom, a receiver for wastes being attached to the inside of the enclosure and located directly under the protrusion when the pan is put on the arms, and a clearance of several millimeters being formed between the outside surface of the oblique rim of the pan and the inside end of the brim when the pan is put on the arms so as to stream hot gases therethrough to make an air curtain.

2. A set as claimed in claim 1, wherein the pan is made of iron, the broad brim of the cookstove is made of aluminum, and a lid for covering the pan when roasting meat is provided.

3. A set as claimed in claim 2, wherein the cookstove is provided with a detachable bottom plate, the heater is disengageable with respect to the bottom plate, and the enclosure is provided with a cutaway portion, thereby allowing the use of various types of heaters.

4. A set as claimed in claim 2, wherein the heater is integrally incorporated with the cookstove, the heater is a gas burner, and the cookstove is provided with a reflecting plate.

5. A set as claimed in claim 3, wherein the heater is an electric heater.

6. A set as claimed in claim 3, wherein the cutaway portion of the pan is about 10 cm long at the upper end of the oblique rim and has a downwardly folded portion, the broad brim of the cookstove is about 10 cm wide and has a thickness of about 5 mm, a low weir is provided on the outer circumference of the broad brim, and the plane of the broad brim is circular but having a linear portion.

7. A set as claimed in claim 4, wherein the cutaway portion of the pan is about 10 cm long at the upper end of the oblique rim, and the broad brim of the cookstove is about 10 cm wide and has a thickness of about 5 mm, said cutaway portion having a downwardly folded portion, said broad brim having a low weir on the outer circumference thereof, the plane of said broad brim being circular and having a linear portion.

8. A set as claimed in claim 5, wherein the cutaway portion of the pan is about 10 cm long at the upper end of the oblique rim, and the broad brim of the cookstove is about 10 cm wide and has a thickness of about 5 mm, said cutaway portion having a downwardly folded portion, said broad brim having a low weir on the outer circumference thereof, the plane of said broad brim being circular and having a linear portion.

9. A set as claimed in claim 7, wherein the cookstove has a bottom plate under the reflecting plate having airports, and the receiver for wastes are formed like a drawer.

10. A set as claimed in claim 1, wherein the net has horizontally projected supporting rods and upwardly projected handles, said rods being caught at the end of the oblique rim of the pan in use and being put on said handles of the pan when the net is lifted off from the pan.

11. A set as claimed in claim 1, wherein the pan is made of iron, and the broad brim of the cookstove is made of aluminum.

12. A set as claimed in claim 1, wherein the pan is made of iron, the broad brim of the cookstove is made of aluminum, and the cookstove is provided with an upper enclosure vertically movable with respect to a lower enclosure having arms for putting the pan thereon.

13. A set as claimed in claim 11, wherein the cookstove has a detachable bottom plate, the heater is detachable with respect to the bottom plate, and the enclosure has a cutaway portion, thereby allowing the use of various types of heaters.

14. A set as claimed in claim 11, wherein the heater is a gas burner integrally incorporated with the cookstove, and the cookstove includes a reflecting plate.

15. A set as claimed in claim 12, wherein the cookstove has a detachable bottom plate, the heater is detachable with respect to the bottom plate, and the enclosure has a cutaway portion, thereby allowing the use of various types of heaters.

16. A set as claimed in claim 12, wherein the heater is a gas burner integrally incorporated with the cookstove, and the cookstove includes a reflecting plate.

17. A set as claimed in claim 13, wherein the heater is an electric heater.

18. A set as claimed in claim 14, wherein the broad brim of the cookstove is about 10 cm wide and has a thickness of about 5 mm, a low weir is provided on the outer circumference of the broad brim, the plane of the broad brim is circular but having a linear portion, and the cookstove has a bottom plate located under the reflecting plate and having airports.

19. In a set comprising a combination of a pan having a flat bottom and an oblique rim divergently extended from the bottom and being provided with a metal net engageable with and disengageable from the pan, and a cookstove used in combination with a heater housed therewithin and having an enclosure and a horizontal brim supported by the enclosure, the enclosure being provided with arms for putting the pan thereon and air ports, the arms being provided in such a manner that a portion of the oblique rim of the pan projecting above the brim is shorter than a portion of the oblique rim of the pan located under the broad brim when the pan is placed on the arms wherein the improvement comprises the brim of the cookstove being broad enough to put fried foods thereon, said brim extending radially inwardly and outwardly from the top of the enclosure for keeping the brim at an appropriate warm temperature when the set is in use and being provided with a low weir on the whole circumferential edge thereof to protect foods and others from dropping therefrom and a clearance of several millimeters being formed between the outside surface of the oblique rim of the pan and the inside end of the brim when the pan is put on the arms so as to stream hot gases therethrough to make an air curtain.

* * * * *